(12) United States Patent
Ryu et al.

(10) Patent No.: US 10,198,067 B2
(45) Date of Patent: Feb. 5, 2019

(54) APPARATUS FOR GENERATING TACTILE SENSATION

(71) Applicant: KOREA UNIVERSITY OF TECHNOLOGY AND EDUCATION INDUSTRY-UNIVERSITY COOPERATION, Cheonan-si, Chungcheongnam-do (KR)

(72) Inventors: Jee Hwan Ryu, Cheonan-si (KR); Harsimran Singh, Cheonan-si (KR)

(73) Assignee: KOREA UNIVERSITY OF TECHNOLOGY AND EDUCATION INDUSTRY-UNIVERSITY COOPERATION FOUNDATION, Cheonan-si, Chungcheongnam-do (KR)

( * ) Notice: Subject to any disclaimer, the term of this patent is extended or adjusted under 35 U.S.C. 154(b) by 65 days.

(21) Appl. No.: 15/521,898

(22) PCT Filed: Aug. 23, 2016

(86) PCT No.: PCT/KR2016/009276
§ 371 (c)(1),
(2) Date: Apr. 26, 2017

(87) PCT Pub. No.: WO2017/034283
PCT Pub. Date: Mar. 2, 2017

(65) Prior Publication Data
US 2017/0329393 A1 Nov. 16, 2017

(51) Int. Cl.
*G08B 6/00* (2006.01)
*G06F 3/01* (2006.01)
(Continued)

(52) U.S. Cl.
CPC .............. *G06F 3/011* (2013.01); *G06F 3/016* (2013.01); *G06F 3/0202* (2013.01); *G08B 6/00* (2013.01); *G09B 21/003* (2013.01)

(58) Field of Classification Search
CPC .......... G06F 3/011; G06F 3/016; G08B 6/00; G09B 21/003
(Continued)

(56) References Cited

U.S. PATENT DOCUMENTS

| 2011/0181405 A1* | 7/2011 | Periquet | F16F 9/535 340/407.2 |
| 2012/0112894 A1* | 5/2012 | Yang | G06F 3/016 340/407.1 |

(Continued)

FOREIGN PATENT DOCUMENTS

KR   10-2010-0011368 A   2/2010
KR   10-0993485 B1       11/2010
(Continued)

OTHER PUBLICATIONS

International Search Report for PCT/KR2016/009276 dated Nov. 18, 2016 from Korean Intellectual Property Office.

*Primary Examiner* — Brent Swarthout
(74) *Attorney, Agent, or Firm* — Revolution IP, PLLC

(57) ABSTRACT

An apparatus for generating a tactile sensation comprises: a tactile sensation generating unit including a magnetorheological fluid, of which the shape changes according to a magnetic field and which comes in contact with a user's body, and a first magnet which is arranged to be surrounded with the magnetorheological fluid, which increases the amount of change of the magnetorheological fluid by the magnetic field thereof, and of which the position changes according to a change in a magnetic field generated by an external source; a magnetic field forming unit for selectively forming a magnetic field around the tactile sensation generating unit; and a control unit which outputs a signal for forming a magnetic field to the magnetic field forming unit (Continued)

when a user's body in contact with the tactile sensation generating unit reaches the surface of a virtual object.

15 Claims, 7 Drawing Sheets

(51) Int. Cl.
*G06F 3/02* (2006.01)
*G09B 21/00* (2006.01)

(58) Field of Classification Search
USPC .......................................... 340/407.1, 407.2
See application file for complete search history.

(56) References Cited

U.S. PATENT DOCUMENTS

| | | | |
|---|---|---|---|
| 2012/0262410 | A1 | 10/2012 | Lim |
| 2017/0256144 | A1* | 9/2017 | Khoshkava ............... G08B 6/00 |
| 2017/0300115 | A1* | 10/2017 | Kerr ......................... G08B 6/00 |

FOREIGN PATENT DOCUMENTS

| | | |
|---|---|---|
| KR | 10-1060968 B1 | 8/2011 |
| KR | 10-1091206 B1 | 12/2011 |

* cited by examiner

APPARATUS FOR GENERATING TACTILE SENSATION

CROSS REFERENCE TO PRIOR APPLICATIONS

This application is a National Stage Application of PCT International Patent Application No. PCT/KR2016/009276 filed on Aug. 23, 2016, under 35 U.S.C. § 371, which claims priority to Korean Patent Application No. 10-2015-0118805 filed on Aug. 24, 2015, which are all hereby incorporated by reference in their entirety.

TECHNICAL FIELD

The present invention relates to an apparatus for generating a tactile sensation, and more particularly, to a technology associated with an apparatus for generating a tactile sensation, which generates a tactile sensation of a body of a user when the body of the user reaches the surface of a virtual object.

BACKGROUND ART

A virtual world means a human-computer interface which makes a user act as if interacting with actual surrounding situations and environments by simulating a specific environment and a specific situation by using a computer. The virtual world may be called artificial reality, cyberspace, virtual reality, virtual environment, synthetic environment, artificial environment, etc.

In a virtual world system, the user and a virtual world space are mutually connected with each other by hardware. The virtual world system allows a participant to primarily visually feel an affair which occurs in the virtual environment and to auxiliarily feel a hearing sensation, a tactile sensation, etc.

The virtual world system may sense a viewpoint of the user or an operational change of the user and grant a change corresponding thereto to the user.

A keyboard, a touch pad, a mouse, a joystick, a data glove, etc., in the related art are just input devices not to thereby transfer information on the virtual object to a person.

A sensation generating apparatus is mounted on a body to generate the sensation when the body of the user reaches the virtual object so as to allow the user to feel the tactile sensation when the body of the user contacts the virtual object, but the sensation generating apparatus in the related art allows the user to feel the sensation by vibration in most cases, and as a result, the sensation is different from the tactile sensation felt when touching an actual object.

DISCLOSURE

Technical Problem

The present invention is contrived to solve the problem in the related art and objects of the present invention are described below.

First, the present invention has been made in an effort to provide a tactile sensation generating apparatus generating a more accurate tactile sensation in a part of a user's body, which contacts the surface of a virtual object.

Second, the present invention has been made in an effort to provide a tactile sensation generating apparatus which enables a user to feel a more delicate tactile sensation.

Third, the present invention has been made in an effort to provide a tactile sensation generating apparatus which enables the user to feel a 3D tactile sensation.

Fourth, the present invention has been made in an effort to provide a tactile sensation generating apparatus which enables the user to feel a similar tactile sensation to disposing a plurality of tactile sensation generating units by means of a single tactile sensation generating unit.

The objects of the present disclosure are not limited to the aforementioned objects, and other objects, which are not mentioned above, will be apparent to a person having ordinary skill in the art from the following description.

Technical Solution

In order to achieve the objects, an apparatus for generating a tactile sensation of the present invention includes a tactile sensation generating unit, a magnetic field forming unit, and a control unit.

The tactile sensation generating unit includes a magnetorheological fluid, of which the shape changes according to a magnetic field and which comes in contact with a user's body so as to allow the user to feel a tactile sensation according to a change in the shape, and a first magnet which is arranged to be surrounded by the magnetorheological fluid, which increases the amount of change of the magnetorheological fluid by the magnetic field thereof, and of which the position changes according to a change in a magnetic field generated by an external source.

The magnetic field forming unit includes one or more solenoids which is provided around the tactile sensation generating unit to generate the magnetic field as power is applied.

The control unit outputs a signal for forming a magnetic field to the magnetic field forming unit when a user's body in contact with the tactile sensation generating unit reaches the surface of a virtual object.

The magnetic field forming unit may include a first solenoid provided to surround the tactile sensation generating unit outside the tactile sensation generating unit, and the control unit may apply current to the first solenoid when a user's body contacting the tactile sensation generating unit reaches the surface of the virtual object.

Meanwhile, the magnetic field forming unit may further include a second solenoid provided to surround the tactile sensation generating unit outside the tactile sensation generating unit, and the control unit may apply the current to the second solenoid when a distance between the user's body contacting the tactile sensation generating unit and the surface of the virtual object reaches a predetermined value.

For example, in the case of a first set value>a second set value>a third set value, the control unit may apply the current to the first solenoid when the distance between the user's body contacting the tactile sensation generating unit and the surface of the virtual object reaches the first set value.

In addition, the control unit may grant, when the distance between the user's body contacting the tactile sensation generating unit and the surface of the virtual object is between the first set value and the second set value, an inverse polarity to the first solenoid to the second solenoid to decrease a change amount of the tactile sensation generating unit.

Alternatively, the control unit may interrupt, when the distance between the user's body contacting the tactile sensation generating unit and the surface of the virtual object is between the second set value and the third set value, the current applied to the second solenoid to transform the tactile sensation generating unit only by the magnetic field generated by the first solenoid.

Alternatively, the control unit may grant, when the distance between the user's body contacting the tactile sensation generating unit and the surface of the virtual object is equal to or less than the third set value, the same polarity as the first solenoid to the second solenoid to increase the change amount of the tactile sensation generating unit.

As a result, the change amount of the tactile sensation generating unit may increase as the distance between the user's body contacting the tactile sensation generating unit and the surface of the virtual object decreases.

Meanwhile, the magnetic field forming unit may include a plurality of solenoids disposed around the tactile sensation generating unit so as to generate the magnetic fields in different directions, respectively, and the control unit may apply the current to the solenoid according to the distance between the user's body contacting the tactile sensation generating unit and the surface of the virtual object or the position of the virtual object to change the tactile sensation generating unit according to the direction of the magnetic field.

Meanwhile, a plurality of tactile sensation generating units may be disposed in the user's body to be spaced apart from each other.

Herein, the control unit may apply the current to the magnetic field forming unit according to an order in which the user's body contacting the plurality of tactile sensation generating units reaches the surface of the virtual object.

Alternatively, the control unit may control the strength of the current applied to the magnetic field forming unit according to the distance between the user's body contacting the plurality of tactile sensation generating units and the surface of the virtual object to adjust the change amount of the tactile sensation generating unit.

In addition, the control unit may increase the strength of the current applied to the magnetic field forming unit as the distance between the user's body contacting the plurality of tactile sensation generating units and the surface of the virtual object decreases.

Meanwhile, an apparatus for generating a tactile sensation of the present invention includes a tactile sensation generating unit, a magnetic field moving unit, and a control unit.

The tactile sensation generating unit includes a magnetorheological fluid, of which the shape changes according to a magnetic field and which comes in contact with a user's body so as to allow the user to feel a tactile sensation according to a change in the shape, and a first magnet which is arranged to be surrounded with the magnetorheological fluid, which increases the amount of change of the magnetorheological fluid by the magnetic field thereof, and of which the position changes according to a change in a magnetic field generated by an external source.

The magnetic field moving unit includes a second magnet forming the magnetic field around the tactile sensation generating unit, and the second magnet moves at one side of the tactile sensation generating unit and changes the position of the magnetic field applied to the tactile sensation generating unit.

The control unit moves the second magnet when the user's body in contact with the tactile sensation generating unit reaches the surface of a virtual object.

As a result, the shape of the tactile sensation generating unit is changed to move a portion which feels the tactile sensation as the magnetic field moves by the magnetic field moving unit.

Herein, the control unit moves the second magnet to a position closest to the surface of the virtual object.

The magnetic field moving unit may further include a rotation plate fixed with the second magnet, and a motor rotating the rotation plate, and as a result, the second magnet may rotate as the motor rotates.

The second magnet may be an electromagnet and the control unit may apply power to the second magnet when the user's body contacting the tactile sensation generating unit reaches the surface of the virtual object.

Meanwhile, a plurality of tactile sensation generating units may be disposed in the user's body to be spaced apart from each other.

Advantageous Effects

Effects of the present invention, which are configured as above are described as below.

First, by an apparatus for generating a tactile sensation according to embodiments of the present invention, while the shape of a tactile sensation generating unit contacting a user's body is transformed, the user's body contacting the tactile sensation generating unit is allowed to feel a tactile sensation to enable a user to feel a more accurate tactile sensation.

Second, by apparatuses for generating a tactile sensation according to second and third embodiments of the present invention, a plurality of solenoids are disposed outside of the tactile sensation generating unit to change the strength of a magnetic field or the direction of the magnetic field applied to the tactile sensation generating unit. Therefore, a user is enabled to feel a more delicate and 3D tactile sensation by adjusting a transformation amount and a transformation direction of the tactile sensation generating unit.

Third, by apparatuses for generating a tactile sensation according to fourth and sixth embodiments of the present invention, a plurality of tactile sensation generating units is disposed in a user's body to allow the user to feel a 3D tactile sensation.

Fourth, by an apparatus for generating a tactile sensation according to a fifth embodiment of the present invention, the shape of a tactile sensation generating unit is changed by moving a second magnet, and as a result, a portion which feels the tactile sensation may move. Therefore, an effect of the plurality of tactile sensation generating units may be expected with one tactile sensation generating unit.

The effects of the present invention are not limited to the aforementioned effect, and other effects, which are not mentioned above, will be apparent to a person having ordinary skill in the art from the description of the claims.

DESCRIPTION OF DRAWINGS

A detailed description of according to a preferred embodiment of the present application, which is described below and a summary described above will be able to be better appreciated when reading the detailed description and the summary in association with the accompanying drawings. Preferred embodiments are illustrated for the purpose of illustrating the present invention. However, the present application is not limited to the illustrated accurate arrangement and means.

EXPLANATION OF REFERENCE NUMERALS AND SYMBOLS

Figure 1:
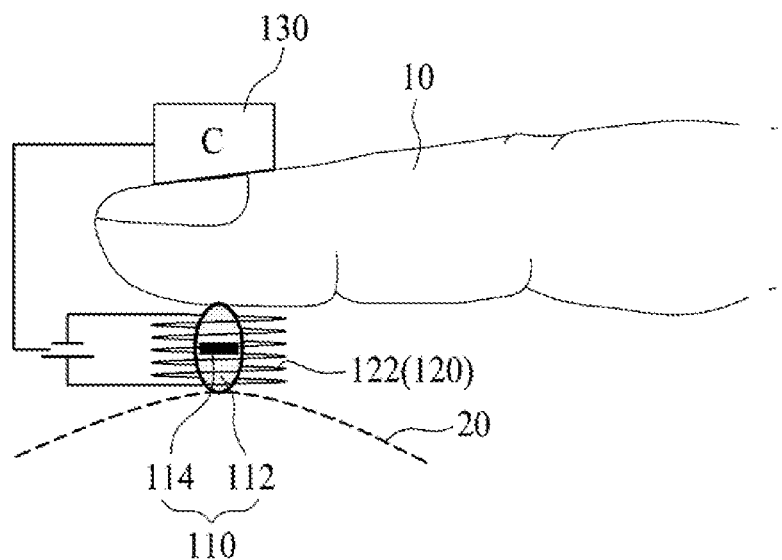
FIGS. 1 and 2 are diagrams illustrating an apparatus for generating a tactile sensation according to a first embodiment of the present invention.

10: Body
20: Virtual object
110: Tactile sensation generating unit
112: Magnetorheological fluid
114: First magnet
120: Magnetic field forming unit
122: First solenoid
130: Control unit
210: Tactile sensation generating unit
212: Magnetorheological fluid
214: First magnet
220: Magnetic field forming unit
222: First solenoid
224: Second solenoid
230: Control unit
310: Tactile sensation generating unit
312: Magnetorheological fluid
314: First magnet
320: Magnetic field forming unit
322: First solenoid
324: Second solenoid
326: Third solenoid
330: Control unit
410: Tactile sensation generating unit
412: Magnetorheological fluid
414: First magnet
420: Magnetic field forming unit
422: First solenoid
430: Control unit
510: Tactile sensation generating unit
512: Magnetorheological fluid
514: First magnet
520: Magnetic field moving unit
522: Second magnet
524: Rotation plate
526: Motor
530: Control unit
610: Tactile sensation generating unit
612: Magnetorheological fluid
614: First magnet
620: Magnetic field moving unit
622: Second magnet
624: Rotation plate
626: Motor
630: Control unit

BEST MODE

Hereinafter, an embodiment of the present invention, in which a purpose of the present invention can be realized in detail will be described with reference to the accompanying drawings. In describing the embodiment, the same name and the same reference numeral are used with respect to the same component and the resulting additional description will be omitted.

Further, in describing the embodiment, components illustrated in the drawings are just examples for assisting understanding the detailed description and it is stated that the claims are not limited by the components.

The present invention relates to an apparatus for generating a tactile sensation, which generates the tactile sensation at a portion of a user's body, which contacts the tactile sensation generating apparatus by receiving a signal from a virtual reality apparatus including a virtual object formed in a virtual object forming apparatus, a sensor sensing the position of the tactile sensation generating unit in a 3D space, and an output unit outputting a signal for generating the tactile sensation in the tactile sensation generating apparatus when the tactile sensation generating unit reaches the surface of the virtual object and the apparatus for generating a tactile sensation may be mounted anywhere in the user's body, but hereinafter, it will be described that the apparatus for generating a tactile sensation according to the present invention is mounted on a finger as an example.

Hereinafter, an apparatus for generating a tactile sensation according to a first embodiment of the present invention will be described with reference to FIGS. 1 and 2.

Figure 2:
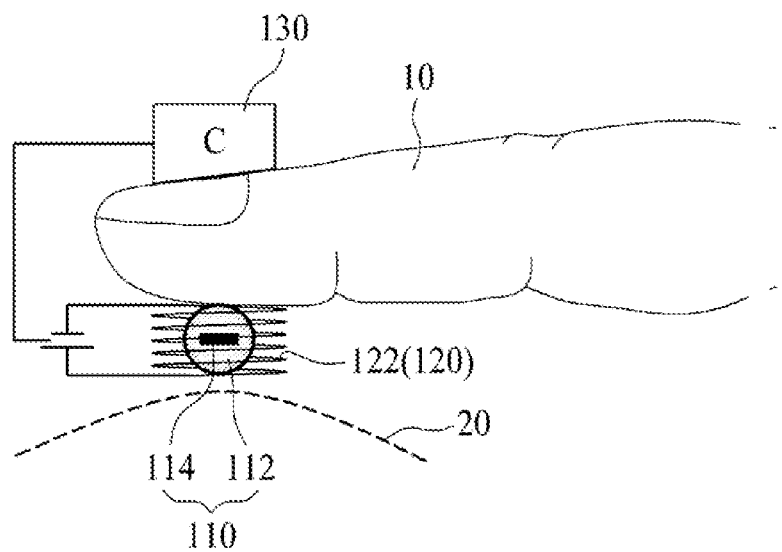

FIGS. 1 and 2 are diagrams illustrating an apparatus for generating a tactile sensation according to a first embodiment of the present invention.

As illustrated in FIGS. 1 and 2, the apparatus for generating a tactile sensation according to the first embodiment of the present invention includes a tactile sensation generating unit 110, a magnetic field forming unit 120, and a control unit 130.

The tactile sensation generating unit 110 includes a magnetorheological fluid 112 and a first magnet 114.

Herein, the magnetorheological fluid 112 is a magnetic fluid and the fluid as a soft magnetic material that coats a particle surface of a magnetic minute particle (ferrite, etc.) having a micron unit or less with long chain unsaturated fatty acid such as oleic acid and is dispersed in a solvent such as water, oil, or acetone by using surfactants has a magnetic characteristic and flowability of a liquid, and as a result, a shape may be changed according to a magnetic field.

For example, the magnetorheological fluid 112 is made of a flexible material to be surrounded with a film of which the shape change is easy. As a result, the tactile sensation generating unit 110 contacts a body 10 of a user and a shape is changed by the magnetic field to allow a user to feel a tactile sensation.

The first magnet 114 is provided to be surrounded with the magnetorheological fluid 112 and a change amount of the magnetorheological fluid 112 is increased by the magnetic field of the first magnet 114 itself to enable the user to feel a large usage sensation and a position is changed according to a change in a direction of the magnetic field generated from by an external source.

The magnetic field forming unit 120 selectively forms the magnetic field around the tactile sensation generating unit 110.

In the embodiment, the magnetic field forming unit 120 may include a solenoid provided to surround the tactile sensation generating unit 110 outside the tactile sensation generating unit 110. That is, the tactile sensation generating unit 110 may be positioned between solenoid coils.

The control unit 130 outputs a signal for forming the magnetic field in the magnetic field forming unit 120 when the body 10 of the user, which contacts the tactile sensation generating unit 110 reaches the surface of a virtual object 20.

In the embodiment, the control unit 130 may apply current to the solenoid when the body 10 of the user, which contacts the tactile sensation generating unit 110 reaches the surface of the virtual object 20.

In the embodiment, the tactile sensation generating unit 110 may have a globular shape in an initial state in which the tactile sensation generating unit 110 is not influenced by the magnetic field.

In addition, the solenoid coil may be disposed vertical to a surface of the tactile sensation generating apparatus, on which a fingerprint of a finger is formed so that one side of the tactile sensation generating unit 110 contacts the finger.

As a result, when the tactile sensation generating unit 110 reaches the surface of the virtual object 20, the current is applied to the solenoid, and as a result, the magnetic field is formed in a longitudinal direction of the solenoid. Therefore, the globular tactile sensation generating unit 110 may be transformed to an oval shape having a length toward the magnetic field.

Therefore, the user may feel the tactile sensation by the change in shape of the tactile sensation generating unit 110 which contacts the finger.

Hereinafter, an apparatus for generating a tactile sensation according to a second embodiment of the present invention will be described with reference to FIGS. 3 and 4.

Figure 3:
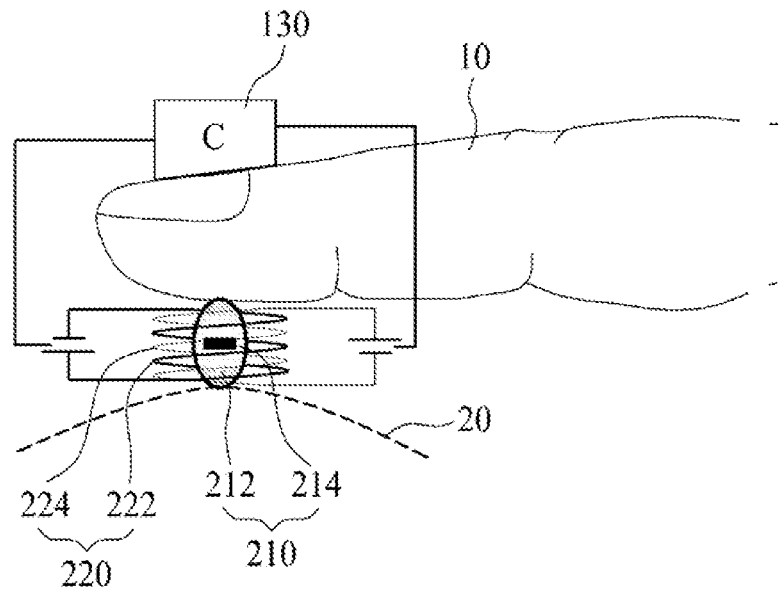
FIGS. 3 and 4 are diagrams illustrating an apparatus for generating a tactile sensation according to a second embodiment of the present invention.
Figure 4:
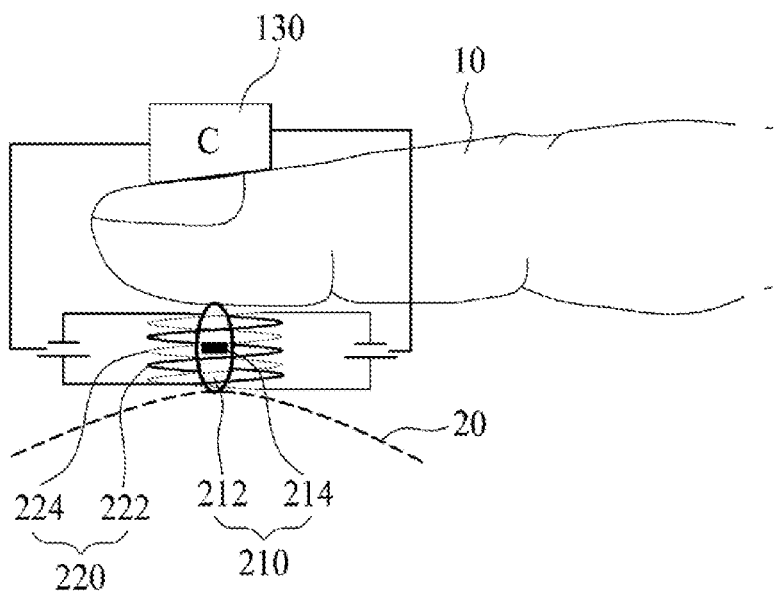

As illustrated in FIGS. 3 and 4, the apparatus for generating a tactile sensation according to the second embodiment of the present invention includes a tactile sensation generating unit 210, a magnetic field forming unit 220, and a control unit 230.

Since the tactile sensation generating unit 210 and a first solenoid 222 of the magnetic field forming unit 220 of the embodiment are similar to those of the first embodiment of the present invention, a description thereof will be omitted.

However, in the embodiment, the magnetic field forming unit 220 may include a second solenoid 224.

The second solenoid 224 may be provided to surround the tactile sensation generating unit 210 outside the tactile sensation generating unit 210. In addition, when a distance between the user's body contacting the tactile sensation generating unit 210 and the surface of the virtual object 20 reaches a predetermined value, the control unit 230 may apply the current to the second solenoid 224.

The same polarity as the first solenoid 222 is granted to the second solenoid 224 and when the first solenoid 222 and the second solenoid 224 form the magnetic field in the same direction, a change amount of a magnetorheological fluid 212 may increase and an inverse polarity to the first solenoid 222 is granted to the second solenoid 224 and when the first solenoid 222 and the second solenoid 224 form a magnetic field in an inverse direction to each other, the change amount of the magnetorheological fluid 212 may decrease. By such a configuration, a more precise tactile sensation may be provided depending on the distance between the surface of the virtual object 20 and the user's body.

For example, when a first set value>a second set value>a third set value, in the case where the distance between the user's body contacting the tactile sensation generating unit 210 and the surface of the virtual object 20 reaches the first set value, the control unit 230 may apply the current to the first solenoid 222.

In addition, when the distance between the user's body contacting the tactile sensation generating unit 210 and the surface of the virtual object 20 is between the first set value and the second set value, the inverse polarity to the first solenoid 222 is granted to the second solenoid 224 to decrease the change amount of the tactile sensation generating unit 210.

Alternatively, when the distance between the user's body contacting the tactile sensation generating unit 210 and the surface of the virtual object 20 is between the second set value and the third set value, the current applied to the second solenoid 224 is interrupted to allow the tactile sensation generating unit 210 to be transformed only by the magnetic field generated by the first solenoid 222.

Alternatively, when the distance between the user's body contacting the tactile sensation generating unit 210 and the surface of the virtual object 20 is equal to or less than the third set value, the same polarity as the first solenoid 222 is granted to the second solenoid 224 to increase the change amount of the tactile sensation generating unit 210.

As a result, as the distance between the user's body contacting the tactile sensation generating unit 210 and the surface of the virtual object 20 decreases, the change amount of the tactile sensation generating unit 210 may increase.

Hereinafter, an apparatus for generating a tactile sensation according to a third embodiment of the present invention will be described with reference to FIGS. 5 to 7.

Figure 5:
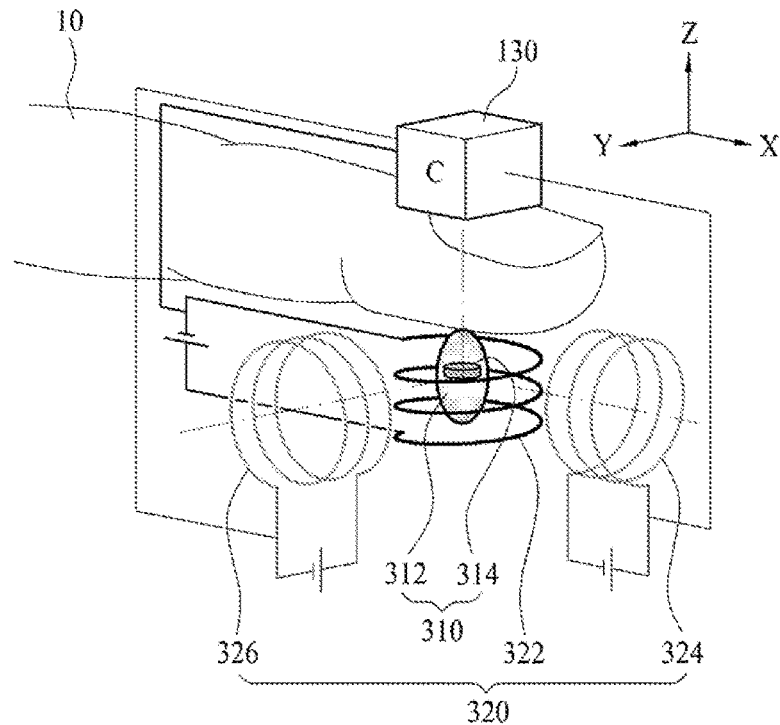
FIGS. 5 to 7 are diagrams illustrating an apparatus for generating a tactile sensation according to a third embodiment of the present invention.
Figure 6:
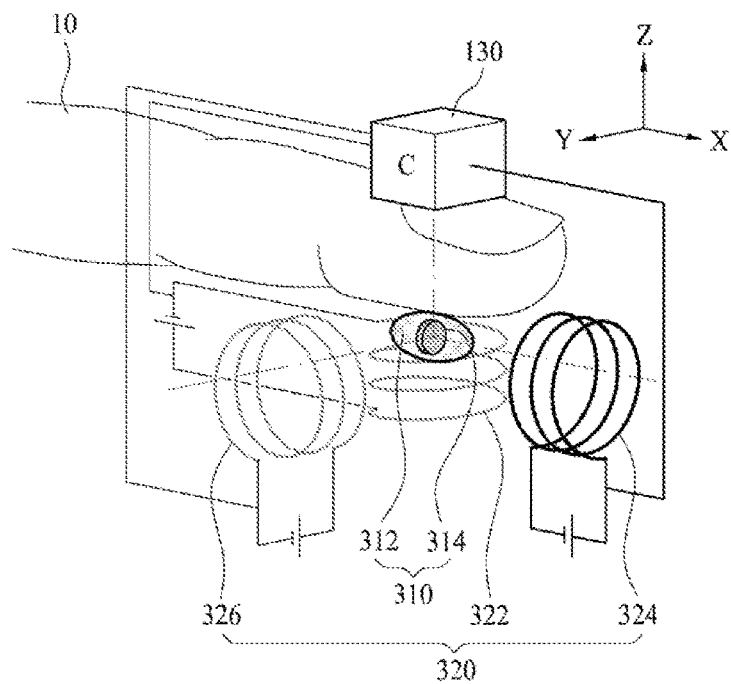
Figure 7:
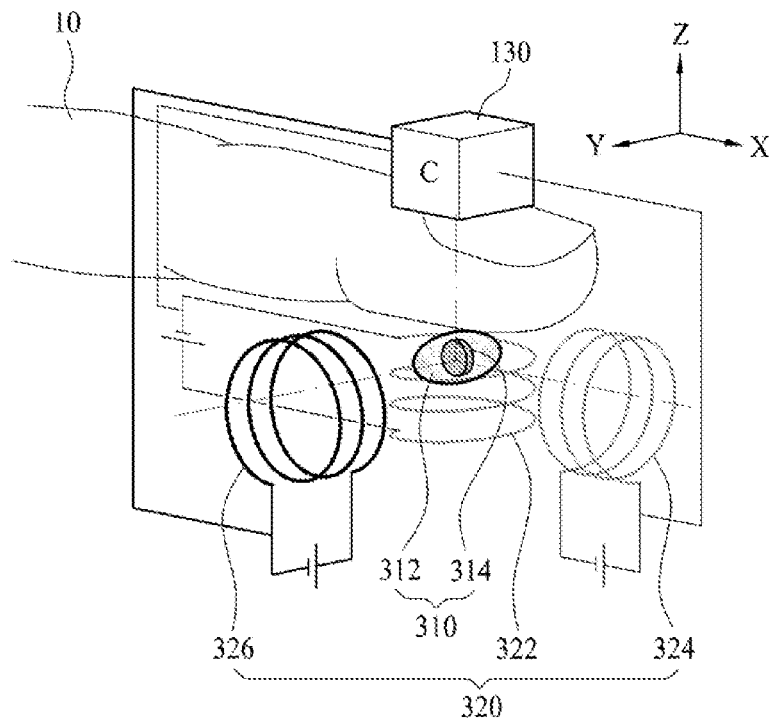

As illustrated in FIGS. 5 to 7, the apparatus for generating a tactile sensation according to the third embodiment of the present invention includes a tactile sensation generating unit 310, a magnetic field forming unit 320, and a control unit.

Since the tactile sensation generating unit 310 and a first solenoid 322 of the magnetic field forming unit 320 of the embodiment are similar to those of the first embodiment of the present invention, a description thereof will be omitted.

However, in the embodiment, the magnetic field forming unit 320 may include a plurality of solenoids disposed around the tactile sensation generating unit 310 so as to generate the magnetic field in different directions, respectively.

The control unit applies current to a solenoid according to the distance between the user's body contacting the tactile sensation generating unit 310 and the surface of the virtual object 20 or the position of the virtual object 20, and as a result, the tactile sensation generating unit 310 may be changed according to the direction of the magnetic field.

For example, as illustrated in FIGS. 5 to 7, the tactile sensation generating unit 310 includes a first solenoid 322, a second solenoid 324, and a third solenoid 326 and the first solenoid 322, the second solenoid 324, and the third solenoid 326 may be disposed to form the magnetic fields in directions of x, y and z axes which are three axes orthogonal to each other, respectively.

As a result, power is applied to the first solenoid 322, the second solenoid 324, or the third solenoid 326 according to the position of the virtual object 20 and the shape of a magnetorheological fluid 312 is changed according to the direction of the magnetic field, and as a result, the user may feel a more delicate and 3D tactile sensation.

Hereinafter, an apparatus for generating a tactile sensation according to a fourth embodiment of the present invention will be described with reference to FIGS. 8 and 9.

Figure 8:
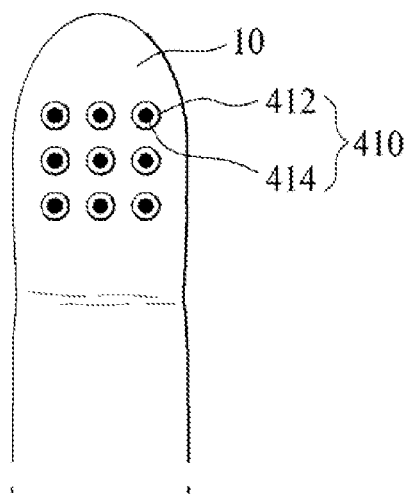
FIGS. 8 and 9 are diagrams illustrating an apparatus for generating a tactile sensation according to a fourth embodiment of the present invention.
Figure 9:
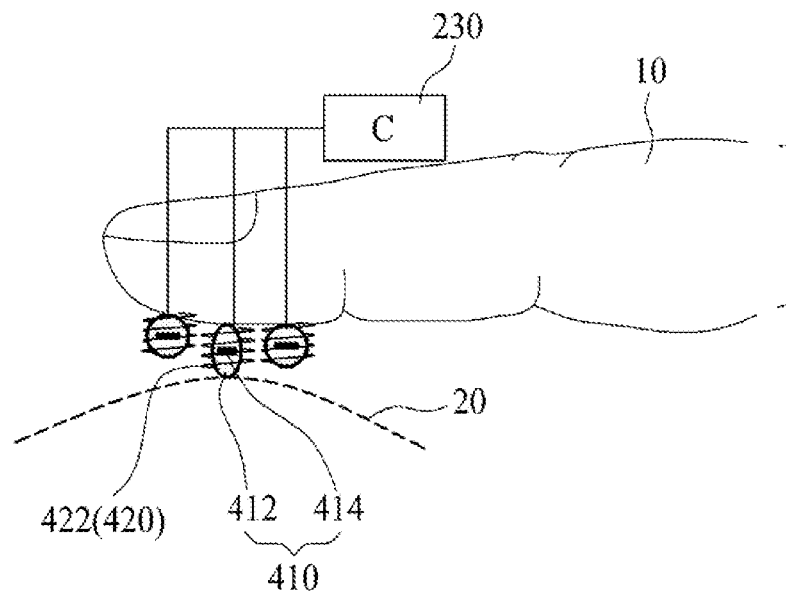

FIGS. 8 and 9 are diagrams illustrating an apparatus for generating a tactile sensation according to a fourth embodiment of the present invention.

As illustrated in FIGS. 8 and 9, the apparatus for generating a tactile sensation according to the fourth embodiment of the present invention includes a tactile sensation generating unit 410, a magnetic field forming unit 420, and a control unit 430.

The tactile sensation generating unit 410 and the magnetic field forming unit 420 of the embodiment are the same as those of an embodiment of the present invention, however, in the embodiment, a plurality of tactile sensation generating units 410 are disposed in the user's body 10 to be spaced apart from each other.

In addition, the control unit 430 may sequentially apply current to the magnetic field forming unit 420 according to an order in which the user's body 10 which contacts the plurality of tactile sensation generating units 410 reaches the surface of the virtual object 20.

For example, when the user first contacts the end of the finger with the surface of the virtual object 20 by moving the finger while a plurality of tactile sensation generating units 410 is straightly disposed from the end of the finger to a palm, the current may be sequentially applied to the magnetic field forming unit 420 according to an order in which the finger contacts the surface of the virtual object 20. As a result, in a manner that the tactile sensation generating unit 410 at the end of the finger is first transformed to allow the user to feel the tactile sensation and the tactile sensation generating unit 410 adjacent thereto is next transformed, the user may be allowed to consecutively feel the tactile sensation.

Alternatively, even when the virtual object 20 moves while the plurality of tactile sensation generating units 410 is straightly disposed from the end of the finger to the palm, the user may be allowed to consecutively feel the tactile sensation in the same manner as described above.

Further, the control unit 430 may control the strength of the current applied to the magnetic field forming unit 420 according to the distances between the user's body 10 which contacts the plurality of tactile sensation generating units 410 and the surface of the virtual object 20.

For example, the control unit 430 may increase the strength of the current applied to the magnetic field forming unit 420 as the distance between the user's body 10 which contacts the plurality of tactile sensation generating units 410 and the surface of the virtual object 20 decreases.

Since the strength of the magnetic field is in proportion to the strength of the current, when the surface of the virtual object 20 is formed by a curved surface, the tactile sensation generating unit 410 closest to the surface of the virtual object 20 may be transformed the most and the tactile sensation generating unit 410 farthest from the surface of the virtual object 20 may be transformed the least. As a result, the user may be allowed to feel a more delicate and 3D tactile sensation.

Hereinafter, a fifth embodiment of the present invention will be described with reference to FIGS. 10 and 11.

Figure 10:
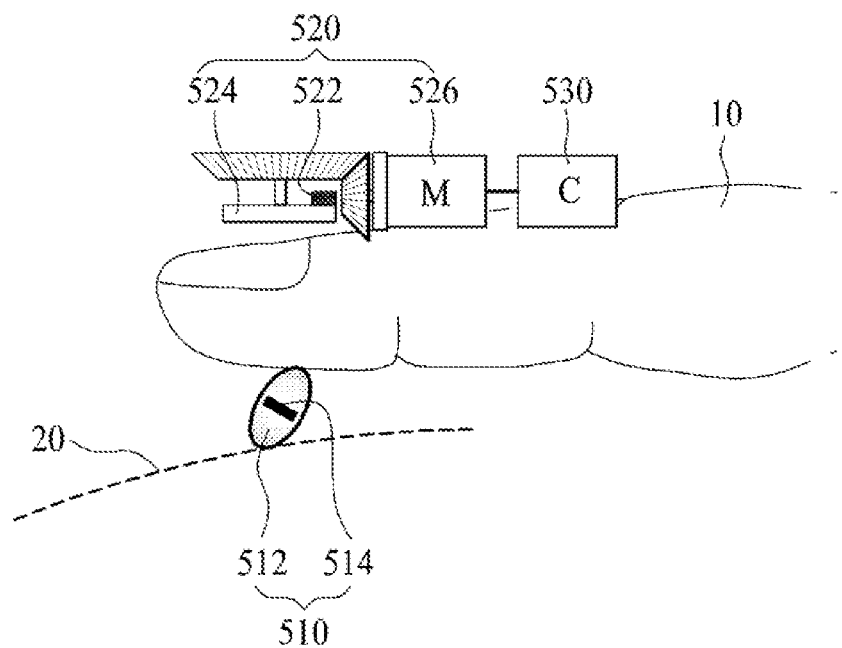
FIGS. 10 to 11 are diagrams illustrating an apparatus for generating a tactile sensation according to a fifth embodiment of the present invention.
Figure 11:
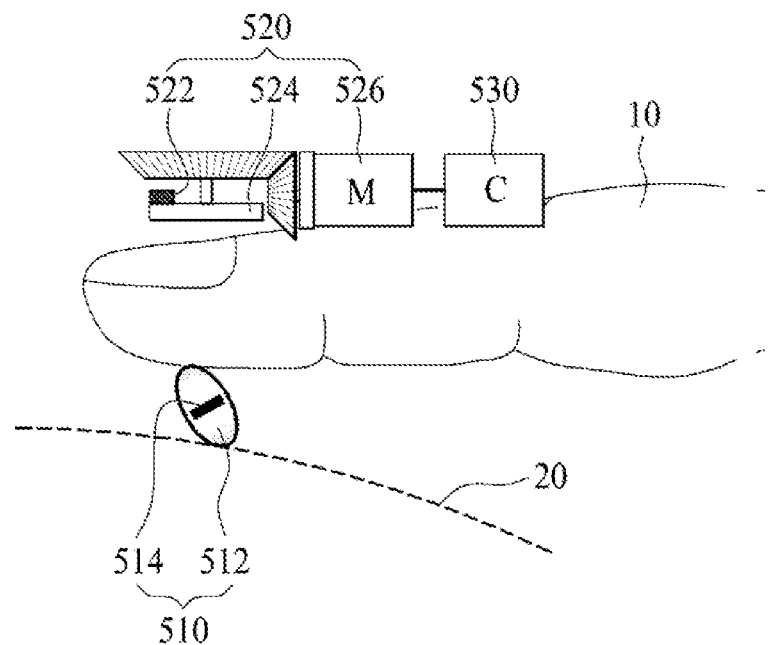

FIGS. 10 and 11 are diagrams illustrating an apparatus for generating a tactile sensation according to a fifth embodiment of the present invention.

As illustrated in FIGS. 10 and 11, the apparatus for generating a tactile sensation according to the fifth embodiment of the present invention includes a tactile sensation generating unit 510, a magnetic field moving unit 520, and a control unit 530.

The tactile sensation generating unit 510 includes the magnetorheological fluid which contacts the user's body 10, and as a result, the shape of the tactile sensation generating unit 510 is changed according to the magnetic field and the user is allowed to feel the tactile sensation as described in the first embodiment.

The magnetic field moving unit 520 moves at one side of the tactile sensation generating unit 510 and changes the position of the magnetic field applied to the tactile sensation generating unit 510.

For example, in the embodiment, the magnetic field moving unit 520 may include a second magnet 522 forming the magnetic field, a rotation plate 524 fixed with the second magnet 522 and rotating the second magnet 522, and a motor 526 rotating the rotation plate 524. Therefore, when the motor 526 is driven, the second magnet 522 fixed to the rotation plate 524 may rotate and the position of the magnetic field may be moved. Further, in the embodiment, the second magnet 522 may be an electromagnet.

In the embodiment, it is described that the magnetic field moving unit 520 is a component that rotates the second magnet 522 as an example, but the component of the magnetic field moving unit 520 is not limited thereto and any component that may change the shape of the tactile sensation generating unit 510 by moving the magnetic field may be variously configured even in any manner.

The control unit 530 moves the magnetic field when the user's body 10 which contacts the tactile sensation generating unit 510 reaches the surface of the virtual object 20. Further, the control unit 530 may apply power to the second magnet 522 when the user's body 10, which contacts the tactile sensation generating unit 510 reaches the surface of the virtual object 20.

For example, when the distance between the user's body 10 and the surface of the virtual object 20 is equal to or less than a predetermined distance, the control unit 530 applies the power to the second magnet 522 and drives the motor 526 to move the second magnet 522 in a direction closest to the surface of the virtual object 20, and as a result, a portion of the body 10 closest to the virtual object 20 may feel the tactile sensation.

Alternatively, when the body 10 moves or the virtual object 20 moves, the shape of the tactile sensation generating unit is changed as the magnetic field moves by the magnetic field moving unit 520 to move the portion which feels the tactile sensation. Hereinafter, an apparatus for generating a tactile sensation according to a sixth embodiment of the present invention will be described with reference to FIGS. 12 and 13.

Figure 12:
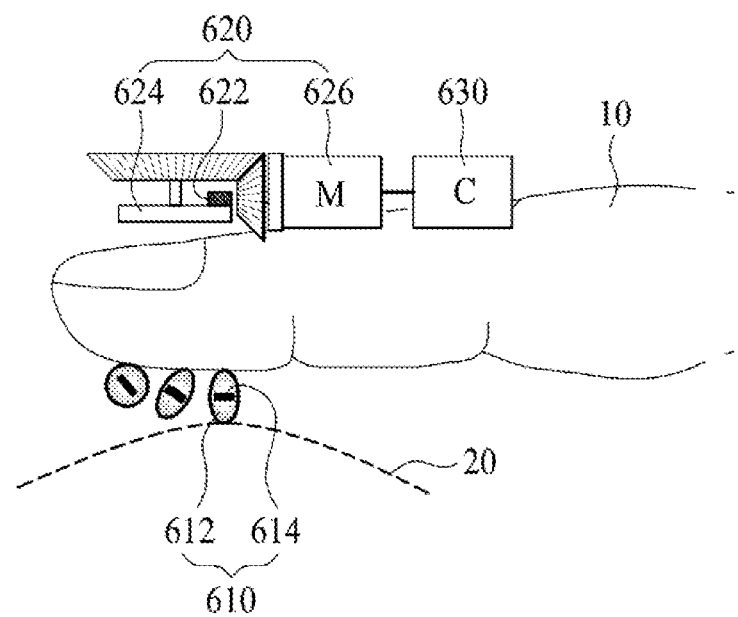
FIGS. 12 and 13 are diagrams illustrating an apparatus for generating a tactile sensation according to a sixth embodiment of the present invention.
Figure 13:
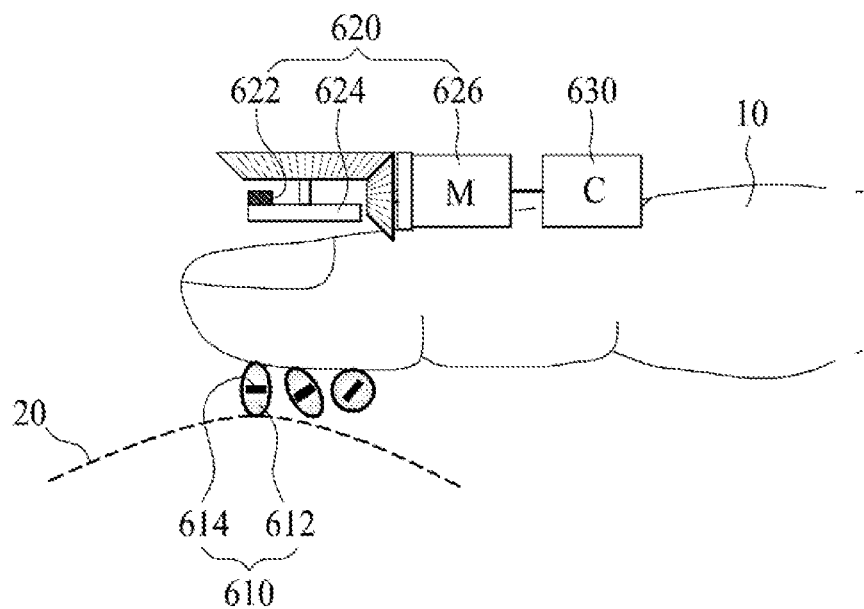

FIGS. 12 and 13 are diagrams illustrating an apparatus for generating a tactile sensation according to a sixth embodiment of the present invention.

As illustrated in FIGS. 12 and 13, the apparatus for generating a tactile sensation according to the sixth embodiment of the present invention includes a tactile sensation generating unit 610, a magnetic field moving unit 620, and a control unit 630.

Since the tactile sensation generating unit 610, the magnetic field moving unit 620, and the control unit 630 of the embodiment are similar to those of the third embodiment of the present invention, a description of the same components will be omitted.

However, in the embodiment, a plurality of tactile sensation generating unit 610 is disposed in the user's body 10 to be spaced apart from each other.

Accordingly, when the distance between the user's body 10 and the surface of the virtual object 20 is equal to or less than a predetermined distance, the control unit 630 applies the power to a second magnet 622 and drives a motor 626 to rotate a rotation plate 624, and as a result, the second magnet 622 moves in a direction closest to the surface of the virtual object 20. Therefore, a portion of the body 10 closest to the virtual object 20 may feel the largest tactile sensation and a portion of the body 10, which contacts the tactile sensation generating unit 610 farthest from the virtual object 20 may feel the smallest tactile sensation. In particular, when the virtual object 20 has the globular shape or the surface of the virtual object 20 is formed by the curved surface, the user may be allowed to feel a more 3D tactile sensation.

Alternatively, when the body 10 moves or the virtual object 20 moves, the shape of the tactile sensation generating unit is changed as the magnetic field moves by the magnetic field moving unit 620 to move the portion which feels the tactile sensation.

An embodiment of the present invention has been described as above and a fact that the present invention can be materialized in other specific forms without departing from the gist or scope in addition to the above described embodiment is apparent to those skilled in the art.

Therefore, the aforementioned embodiment is not limited but should be considered to be illustrative, and as a result, the present invention is not limited to the above description and may be modified within the scope of the appended claims and a range equivalent thereto.

The invention claimed is:

1. An apparatus for generating a tactile sensation, comprising:
a tactile sensation generating unit including a magnetorheological fluid, of which the shape changes according to a magnetic field and which comes in contact with a user's body so as to allow the user to feel a tactile sensation according to a change in the shape, and a first magnet which is arranged to be surrounded with the magnetorheological fluid, which increases the amount of change of the magnetorheological fluid by the magnetic field thereof, and of which the position changes according to a change in a magnetic field generated by an external source;
a magnetic field forming unit including one or more solenoids provided around the tactile sensation generating unit and generating the magnetic field by being applied with power; and
a control unit which outputs a signal for forming a magnetic field to the magnetic field forming unit when a user's body in contact with the tactile sensation generating unit reaches the surface of a virtual object.

2. The apparatus for generating a tactile sensation of claim 1, wherein the magnetic field forming unit includes a first solenoid provided to surround the tactile sensation generating unit outside the tactile sensation generating unit, and
the control unit applies current to the first solenoid when a user's body contacting the tactile sensation generating unit reaches the surface of the virtual object.

3. The apparatus for generating a tactile sensation of claim 2, wherein the magnetic field forming unit further includes a second solenoid provided to surround the tactile sensation generating unit outside the tactile sensation generating unit, and
the control unit applies the current to the second solenoid when a distance between the user's body contacting the tactile sensation generating unit and the surface of the virtual object reaches a predetermined value.

4. The apparatus for generating a tactile sensation of claim 3, wherein in the case of a first set value>a second set value>a third set value,
the control unit
applies the current to the first solenoid when the distance between the user's body contacting the tactile sensation generating unit and the surface of the virtual object reaches the first set value,
grants, when the distance between the user's body contacting the tactile sensation generating unit and the surface of the virtual object is between the first set value and the second set value, an inverse polarity to the first solenoid to the second solenoid to decrease a change amount of the tactile sensation generating unit,
interrupts, when the distance between the user's body contacting the tactile sensation generating unit and the surface of the virtual object is between the second set value and the third set value, the current applied to the second solenoid to transform the tactile sensation generating unit only by the magnetic field generated by the first solenoid, and
grants, when the distance between the user's body contacting the tactile sensation generating unit and the surface of the virtual object is equal to or less than the third set value, the same polarity as the first solenoid to the second solenoid to increase the change amount of the tactile sensation generating unit, and as a result,
the change amount of the tactile sensation generating unit increases as the distance between the user's body contacting the tactile sensation generating unit and the surface of the virtual object decreases.

5. The apparatus for generating a tactile sensation of claim 1, wherein the magnetic field forming unit includes a plurality of solenoids disposed around the tactile sensation generating unit so as to generate the magnetic fields in different directions, respectively, and
the control unit applies the current to the solenoid according to the distance between the user's body contacting the tactile sensation generating unit and the surface of the virtual object or the position of the virtual object to change the tactile sensation generating unit according to the direction of the magnetic field.

6. The apparatus for generating a tactile sensation of claim 1, wherein a plurality of tactile sensation generating units are disposed in the user's body to be spaced apart from each other.

7. The apparatus for generating a tactile sensation of claim 6, wherein the control unit applies the current to the magnetic field forming unit according to an order in which the user's body contacting the plurality of tactile sensation generating units reaches the surface of the virtual object.

8. The apparatus for generating a tactile sensation of claim 6, wherein the control unit controls the strength of the current applied to the magnetic field forming unit according to the distance between the user's body contacting the plurality of tactile sensation generating units and the surface of the virtual object to adjust the change amount of the tactile sensation generating unit.

9. The apparatus for generating a tactile sensation of claim 8, wherein the control unit increases the strength of the current applied to the magnetic field forming unit as the distance between the user's body contacting the plurality of tactile sensation generating units and the surface of the virtual object decreases.

10. An apparatus for generating a tactile sensation, comprising:
a tactile sensation generating unit including a magnetorheological fluid, of which the shape changes according to a magnetic field and which comes in contact with a user's body so as to allow the user to feel a tactile sensation according to a change in the shape, and a first magnet which is arranged to be surrounded with the magnetorheological fluid, which increases the amount of change of the magnetorheological fluid by the magnetic field thereof, and of which the position changes according to a change in a magnetic field generated by an external source;

a magnetic field moving unit including a second magnet forming the magnetic field around the tactile sensation generating unit, the second magnet moving at one side of the tactile sensation generating unit and changing the position of the magnetic field applied to the tactile sensation generating unit; and a control unit moving the second magnet when the user's body in contact with the tactile sensation generating unit reaches the surface of a virtual object, and as a result, wherein the shape of the tactile sensation generating unit is changed to move a portion which feels the tactile sensation as the magnetic field moves by the magnetic field moving unit.

11. The apparatus for generating a tactile sensation of claim 10, wherein the control unit moves the second magnet to a position closest to the surface of the virtual object.

12. The apparatus for generating a tactile sensation of claim 10, wherein the magnetic field moving unit further includes a rotation plate fixed with the second magnet, and a motor rotating the rotation plate, and as a result, the second magnet rotates as the motor rotates.

13. The apparatus for generating a tactile sensation of claim 10, wherein the second magnet is an electromagnet and the control unit applies power to the second magnet when the user's body contacting the tactile sensation generating unit reaches the surface of the virtual object.

14. The apparatus for generating a tactile sensation of claim 10, wherein a plurality of tactile sensation generating units are disposed in the user's body to be spaced apart from each other.

15. The apparatus for generating a tactile sensation of claim 2, wherein a plurality of tactile sensation generating units are disposed in the user's body to be spaced apart from each other.

* * * * *